(12) United States Patent
Wang et al.

(10) Patent No.: US 12,236,690 B2
(45) Date of Patent: Feb. 25, 2025

(54) VEHICLE CONTROL METHOD, APPARATUS, ELECTRONIC DEVICE AND VEHICLE

(71) Applicant: Apollo Intelligent Connectivity (Beijing) Technology Co., Ltd., Beijing (CN)

(72) Inventors: Xingyu Wang, Beijing (CN); Dengxiang Zhuang, Beijing (CN); Ning Yu, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 479 days.

(21) Appl. No.: 17/572,552

(22) Filed: Jan. 10, 2022

(65) Prior Publication Data
US 2022/0130153 A1 Apr. 28, 2022

(30) Foreign Application Priority Data
Apr. 16, 2021 (CN) .......................... 202110414487.8

(51) Int. Cl.
*G06V 20/58* (2022.01)
*B60W 30/18* (2012.01)
(Continued)

(52) U.S. Cl.
CPC ..... *G06V 20/584* (2022.01); *B60W 30/18154* (2013.01); *B60W 40/04* (2013.01); *G06V 10/56* (2022.01)

(58) Field of Classification Search
None
See application file for complete search history.

(56) References Cited

U.S. PATENT DOCUMENTS 8,482,431 B2 * 7/2013 Kushi ................... G08G 1/161
340/901
10,916,130 B2 2/2021 Zhu
(Continued)

FOREIGN PATENT DOCUMENTS

| CN | 102084405 A | 6/2011 |
| CN | 104575033 A | 4/2015 |

(Continued)

OTHER PUBLICATIONS

First Office Action of the prioriryt China application CN202110414487.8.
(Continued)

*Primary Examiner* — Samah A Beg
(74) *Attorney, Agent, or Firm* — J.C. PATENTS (57) ABSTRACT

The present disclosure provides a vehicle control method, an apparatus, an electronic device and a vehicle, which relates to a technical field of artificial intelligence, such as automatic driving, intelligent transportation and computer vision, etc. The specific implementation solution is that: when passing a traffic light intersection, a vehicle can acquire a traffic light image of the intersection at a driving direction of the vehicle, identify the traffic light image, determine a first light color of a target traffic light corresponding to a lane on which the vehicle is located; and acquire light color change information of the target traffic light latest recorded; determine remained duration of the first light color according to the light color change information, then determine a driving strategy at the intersection of the vehicle according to the first light color and the remained duration of the first light color.

18 Claims, 5 Drawing Sheets

(51) Int. Cl.
  *B60W 40/04* (2006.01)
  *G06V 10/56* (2022.01)

(56) References Cited

U.S. PATENT DOCUMENTS

| | | | |
|---|---|---|---|
| 2008/0253615 | A1 | 10/2008 | Kubota |
| 2015/0262483 | A1* | 9/2015 | Sugawara ........ G08G 1/096783 340/929 |
| 2018/0162409 | A1* | 6/2018 | Altmannshofer ............................ G08G 1/096708 |
| 2019/0332875 | A1* | 10/2019 | Vallespi-Gonzalez ...................... G06F 18/217 |
| 2020/0312127 | A1 | 10/2020 | Doemling |
| 2022/0001899 | A1* | 1/2022 | Kim .................. B60W 60/0053 |
| 2022/0139220 | A1* | 5/2022 | Yu .................... G08G 1/096775 340/909 |
| 2022/0222476 | A1* | 7/2022 | Xiao ..................... G06V 20/46 |
| 2024/0282191 | A1* | 8/2024 | Zeiynali Farid ..... G08G 1/0145 |

FOREIGN PATENT DOCUMENTS

| | | |
|---|---|---|
| CN | 108831175 A | 11/2018 |
| CN | 108961797 A | 12/2018 |
| CN | 109686116 A | 4/2019 |
| CN | 109949590 A | 6/2019 |
| CN | 110979323 A | 4/2020 |
| CN | 111591306 A | 8/2020 |
| CN | 112384760 A | 2/2021 |
| JP | 2006048624 A | 2/2006 |
| JP | 2008242986 A | 10/2008 |
| JP | 2010134851 A | 6/2010 |
| JP | 2012048345 A | 3/2012 |
| JP | 2012246828 A | 12/2012 |
| JP | 2017016279 A | 1/2017 |
| JP | 2018097855 A | 6/2018 |
| JP | 2020166487 A | 10/2020 |
| KR | 20180116808 A | 10/2018 |
| WO | WO2014115309 A1 | 7/2014 |

OTHER PUBLICATIONS

Extended European Search Report of the parallel application EP22151021.7.
First Office Action of the parallel application JP2022-006241.
Second Office Action of the priority application CN202110414487.8.
First Office Action of the parallel application KR10-2022-0007083.

* cited by examiner

VEHICLE CONTROL METHOD, APPARATUS, ELECTRONIC DEVICE AND VEHICLE

CROSS-REFERENCE TO RELATED APPLICATIONS

This application claims priority to Chinese Patent Application No. 202110414487.8, filed on Apr. 16, 2021, which is hereby incorporated by reference in its entirety.

TECHNICAL FIELD

The present application relates to a technical field of data processing, in particular to a vehicle control method, an apparatus, an electronic device and a vehicle, which can be used specifically in a technical field of artificial intelligence, such as automatic driving, intelligent transportation and computer vision, etc.

BACKGROUND

Current unmanned driving technology has become an important direction of the development of automobiles. Traffic situation of a traffic light intersection is the most complicated, in particular in rainy and foggy weather, or when driving behind a large vehicle, it is more difficult to acquire traffic light information. How to ensure an unmanned driving vehicle to safely pass the traffic light intersection is a crucial issue in the technical field of unmanned driving.

In the prior art, when the unmanned driving vehicle is passing the traffic light intersection, a road lamp device can transmit light colors of the traffic lights at current traffic light intersection and remained durations of the light colors to the unmanned driving vehicle through a V2X communication device, to cause the unmanned driving vehicle to safely pass the traffic light intersection based on the acquired light colors of the traffic lights at the current traffic light intersection and the remained durations of the light colors.

However, in a condition that the road lamp device or the unmanned driving vehicle is not equipped with the V2X communication device, the unmanned driving vehicle will drive blindly, in a condition that it approaches a stop line and a green light suddenly changes to a yellow light, the unmanned driving vehicle will execute an emergency brake to stop at the stop line, which not only causes a poor user experience, but also has potential safety hazards, resulting in poor safety of vehicle driving.

SUMMARY

The present application provides a vehicle control method, an apparatus, an electronic device and a vehicle.

According to a first aspect, a vehicle control method is provided, the vehicle control method may include:
 acquiring a traffic light image of an intersection at a driving direction of a vehicle;
 identifying the traffic light image and determining a first light color of a target traffic light corresponding to a lane on which the vehicle is located;
 acquiring light color change information of the target traffic light latest recorded;
 determining, according to the light color change information, remained duration of the first light color;
 determining, according to the first light color and the remained duration of the first light color, a driving strategy at the intersection of the vehicle.

According to a second aspect, a vehicle is provided, the vehicle may include the vehicle control apparatus described in the above second aspect.

According to a third aspect, an electronic device is provided, the electronic device may include:
 at least one processor; and
 a memory communicatively connected with the at least one processor; where,
 the memory stores instructions capable of being executed by the at least one processor, the instructions are executed by the at least one processor to enable the at least one processor to execute the vehicle control method described in the above first aspect.

According to a fourth aspect, a non-transitory computer readable storage medium storing computer instructions is provided, where the computer instructions are used to execute the vehicle control method described in the above first aspect.

According to a fifth aspect, a computer program product is provided, the computer program product may include: a computer program, the computer program stores in a readable storage medium, at least one processor of an electronic device can read the computer program from the readable storage medium, the at least one processor executes the computer program to enable the electronic device to execute the vehicle control method described in the above first aspect.

It should be understood that what is described in this section is not intended to identify key or important features of embodiments of the present application, nor is it intended to limit the scope of the present application. Other features of the present application will become easy to be understood from the following description.

BRIEF DESCRIPTION OF THE DRAWINGS

The accompanying drawings are used for better understanding of the solutions and do not constitute a limitation to the present application, in which.

DESCRIPTION OF EMBODIMENTS

Illustrative embodiments of the embodiments of the present application will be described below with reference to accompanying drawings, where various details of the embodiments of the present application are included to facilitate understanding, and should be considered as merely illustrative. Therefore, it should be recognized by those of ordinary skill in the art that various changes and modifications can be made to the embodiments described here without departing from the scope and spirit of the embodiments of the present application. Also, for clarity and conciseness, descriptions of well-known functions and structures are omitted in the following description.

In the embodiments of the present application, "at least one" means one or more, "more" means two or more than two. "And/or" describes an association relationship of associated objects, and indicates that there may be three kinds of relationships, for example, "A and/or B" may indicate three cases: A exists alone, both A and B exist at the same time, and B exists alone, where A, B may be singular or plural. In the text description of the present application, the character "/" generally indicates that the associated objects before and after the character are in an "or" relationship.

The technical solution provided by the embodiments of the present application can be applied in a scenario where the vehicle is driving safely. When an unmanned driving vehicle is passing a traffic light intersection, regarding a traffic light intersection with a countdown of remained durations of traffic lights, the unmanned driving vehicle can safely pass the traffic light intersection with the countdown of the remained durations of the traffic lights based on the countdown of the remained durations of the traffic lights. The technical solution provided by the embodiments of the present application is mainly for a traffic light intersection without a countdown of the remained durations of the traffic lights, the unmanned driving vehicle cannot pass the traffic light intersection with reference to the countdown of the remained durations of the traffic lights. Therefore, how to safely pass the traffic light intersection without the countdown of the remained durations of the traffic lights is a crucial issue in the technical field of unmanned driving.

In the prior art, when the unmanned driving vehicle is passing the traffic light intersection without the countdown of the remained durations of the traffic lights, a road lamp device can transmit light colors of the traffic lights at current traffic light intersection and the remained durations of the light colors to the unmanned driving vehicle through a V2X communication device, so that the unmanned driving vehicle can safely pass the traffic light intersection based on the acquired light colors of the traffic lights at the current traffic light intersection and the remained durations of the light colors. However, in a condition that the road lamp device or the unmanned driving vehicle is not equipped with the V2X communication device, the unmanned driving vehicle will drive blindly, in a condition that it approaches a stop line and a green light suddenly changes to a yellow light, the unmanned driving vehicle will execute an emergency brake to stop at the stop line, which not only causes a poor user experience, but also has potential safety hazards, resulting in poor safety of vehicle driving.

Figure 1:
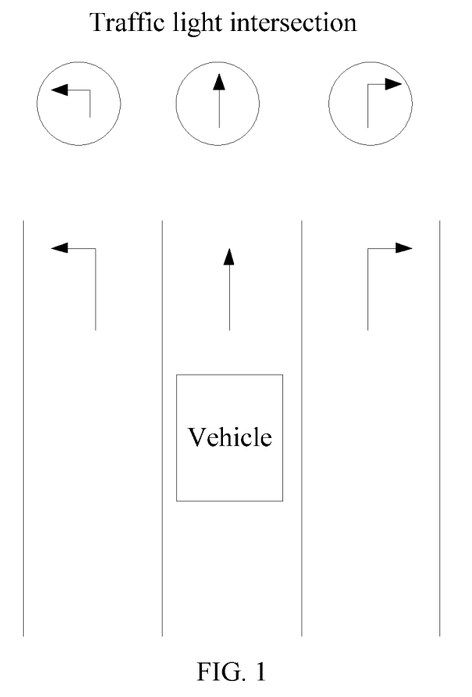
FIG. 1 is a schematic diagram of an application scenario provided by an embodiment of the present application.

For example, please refer to FIG. 1, FIG. 1 is a schematic diagram of an application scenario provided by an embodiment of the present application, the application scenario may include traffic lights and a vehicle driving on a road. When the vehicle is driving on a straight lane, a road lamp device can transmit light colors of all of the traffic lights at the current traffic light intersection and remained durations of the light colors to the vehicle through a V2X communication device, the vehicle can determine a light color of the traffic light corresponding to the straight lane on which the vehicle is located and a remained duration of the light color based on the acquired light colors of all of the traffic lights and the remained durations of the light colors. Assuming that the light color of the traffic light corresponding to the current straight lane is green, the remained duration is 2 S, in order to ensure the vehicle to safely pass the traffic light, the vehicle can be controlled to slow down and brake smoothly, when the light color of the traffic light corresponding to the straight lane changes to green again, the vehicle can be controlled again to safely pass the traffic light intersection. However, in a condition that the road lamp device or the driving vehicle is not equipped with the V2X communication device, the vehicle can determine that the light color of the traffic light corresponding to the current straight lane is green through identifying the light colors of all the traffic lights at the current traffic light intersection, but cannot acknowledge the remained duration of the light color, the vehicle will still control the vehicle to continue driving based on the light color, even if the remained duration of the light color is 2 S. In a condition that it approaches a stop line and the green light suddenly changes to the yellow light, the vehicle will execute an emergency brake to stop at the stop line, which not only causes a poor user experience, but also has potential safety hazards, resulting in poor safety of vehicle driving.

In order to enable the vehicle to safely pass the traffic light intersection, thereby improving the safety of vehicle driving, it can be considered that based on the identification of the light color of the traffic light corresponding to the current straight lane is green, further calculating and determining the remained duration corresponding to the current light color. In this way, it is possible to safely pass the traffic light intersection based on the light color of the traffic light corresponding to the current straight lane and the remained duration of the light color, thereby improving the safety of vehicle driving.

Based on the above technological conception, the embodiments of the present application provide a vehicle control method, which can be applied in the scenario where the vehicle is driving safely. When passing the intersection, the vehicle can acquire the traffic light image of the intersection at the driving direction of the vehicle, identify the traffic light image, determine the first light color of the target traffic light corresponding to the lane on which the vehicle is located; and acquire the light color change information of the target traffic light latest recorded; then determine the remained duration of the first light color according to the light color change information, finally determine the driving strategy at the intersection of the vehicle according to the first light color and the remained duration of the first light color.

The traffic lights can be understood as traffic indicator lights installed on the same utility pole, such as a left turn indicator light, a straight forward indicator light and a right turn indicator light.

It can be understood that, in the embodiments of the present application, the first light color can be determined according to a light color change rule of a target traffic light. For example, in a condition that the light color change rule of the target traffic light is a red light changes to the green light, the green light changed to the yellow light and the yellow light changes to red light, then the first light color may be one of green, yellow or red; in a condition that the light color change rule of the target traffic light is a red light changes to the green light, the green light changed to the red light, then the first light color may be one of green or red, which can be set specifically according to actual needs. The embodiments of the present application will not make specific restrictions.

The light color change information may also be determined according to the light color change rule of the target traffic light, the light color change information of the target traffic light latest recorded can be understood as the light color change information of the target traffic light that is latest recorded before current moment. For example, in a condition that the light color change rule of the target traffic light is the red light changes to the green light, the green light changed to the yellow light and the yellow light changes to red light, then the light color change information may be: the red changes to green, the changing moment is moment a; or the light color change information is: the green changes to yellow, the changing moment is moment b; or the light color change information is: the yellow changes to red, the changing moment is moment c. In a condition that the light color change rule of the target traffic light is the red light changes to the green light, the green light changed to the red light, then the light color change information may be: the red changes to green, the changing moment is moment d; or the light color change information is: the green changes to red, the changing moment is moment e, which can be set according to actual needs. The embodiments of the present application will not make specific restrictions.

It can be seen that in the embodiments of the present application, when passing a traffic light intersection, the vehicle can acquire the traffic light image of the intersection at the driving direction of the vehicle, identify the traffic light image, determine the first light color of the target traffic light corresponding to the lane on which the vehicle is located; and acquire the light color change information of the target traffic light latest recorded; determine the remained duration of the first light color according to the light color change information, then determine the driving strategy at the intersection of the vehicle according to the first light color and the remained duration of the first light color. In this way, the vehicle can determine the driving strategy at the intersection of the vehicle based on the first light color of the target traffic light corresponding to the lane on which the vehicle is located together with the remained duration of the first light color, so as to safely pass the traffic light intersection based on this driving strategy, thereby improving safety of vehicle driving.

The vehicle control method provided by the present application will be described in detail with specific embodiments below. It can be understood that the following several specific embodiments can be combined with each other, and the same or similar concepts or processes may not be repeated in some embodiments.

First Embodiment

Figure 2:
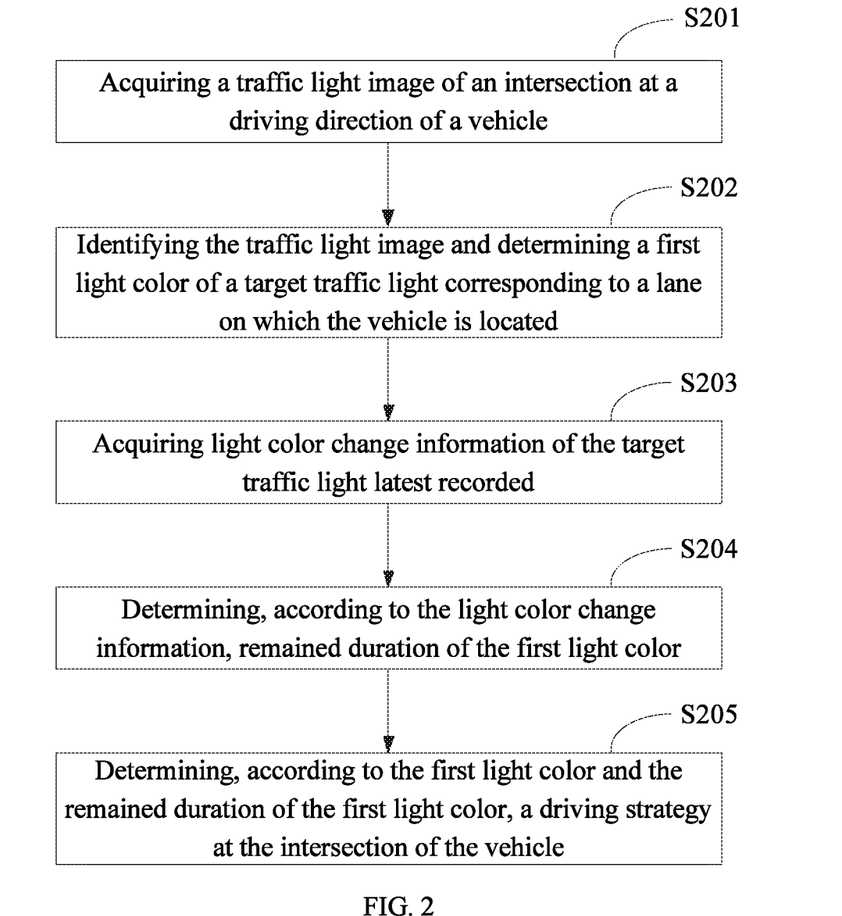
FIG. 2 is a schematic flowchart diagram of a vehicle control method provided by a first embodiment of the present application.

FIG. 2 is a schematic flowchart diagram of a vehicle control method provided by a first embodiment of the present application, the vehicle control method can be executed by software and/or a hardware apparatus, for example, the hardware apparatus may be a terminal or a server. For example, please refer to FIG. 2, the vehicle control method may include:

S201: acquiring a traffic light image of an intersection at a driving direction of a vehicle.

For example, when the vehicle is acquiring the traffic light image of the intersection at the driving direction of the vehicle, the vehicle may acquire the traffic light image through a sensing module deployed in the vehicle, specifically acquire the traffic light image through a sensor in the sensing module. Normally, sensors in the sensing module are mainly vision sensors.

After acquiring the traffic light image of the intersection at the driving direction of the vehicle, the traffic light image can be further identified, and a first light color of a target traffic light corresponding to a lane on which the vehicle is located can be determined, that is, the following S202 is executed:

S202: identifying the traffic light image and determining a first light color of a target traffic light corresponding to a lane on which the vehicle is located.

For example, when the traffic light image is identified and the first light color of the target traffic light corresponding to the lane on which the vehicle is located is determined, firstly the traffic light image can be identified, the light color of the traffic light corresponding to a respective lane in the traffic light image is determined; and the vehicle is located and the lane on which the vehicle is located is determined; then, according to the light color of the traffic light corresponding to the respective lane, the first light color of the target traffic light corresponding to the lane on which the vehicle is located is determined.

The specific process may be: an identification module in the vehicle may identify the traffic light image base on a neural network detection algorithm, determine the light color of the respective traffic light included in the traffic light image, and acquire an ID of the traffic light corresponding to the respective lane in the traffic light image from a map annotation; normally, the traffic light image includes multiple traffic lights, it is shown in combination with the above FIG. 1, the traffic light image may include a left turn indicator light used to indicate turning left, a straight forward indicator light used to indicate going straight forward, a right turn indicator light used to indicate turning right; and in combination with the map annotation, the map annotation includes a binding relationship of the respective traffic light and a corresponding lane, the vehicle can determine the lane on which it is located according to a locating module, determine the ID of the traffic light corresponding to the lane on which it is located, then determine a first light color of a target traffic light corresponding to the lane on which the vehicle is located; in which, the target traffic light is used to assist in instructing the vehicle to drive safely on the lane on which the vehicle is located.

It can be understood that in the embodiments of the present application, when passing the intersection, after determining the first light color of the target traffic light corresponding to the lane on which the vehicle is located, instead of controlling the vehicle to drive directly according to the first light color of the target traffic light corresponding to the lane on which the vehicle is located, the vehicle further calculates and determines the remained duration corresponding to the first light color based on the determination of the first light color of the target traffic light, and safely passes the traffic light intersection by controlling based on the first light color together with the remained duration of the first light color, which can effectively improve the safety of vehicle driving.

When further calculating the remained duration of the first light color, a light color change information of the target traffic light latest recorded can be acquired first, and the remained duration of the first light color is determined according to the light color change information, that is the following S203 and S204 are executed:

S203: acquiring light color change information of the target traffic light latest recorded;

in which, the light color change information may also be determined according to the light color change rule of the target traffic light, the light color change information of the target traffic light latest recorded can be understood as the light color change information of the target traffic light that is latest recorded before current moment. For example, in a condition that the light color change rule of the target traffic light is the red light changes to the green light, the green light changed to the yellow light and the yellow light changes to red light, then the light color change information may be: the red changes to green, the changing moment is moment a; or the light color change information is: the green changes to yellow, the changing moment is moment b; or the light color change information is: the yellow changes to red, the changing moment is moment c. In a condition that the light color change rule of the target traffic light is the red light changes to the green light, the green light changed to the red light, then the light color change information may be: the red changes to green, the changing moment is moment d; or the light color change information is: the green changes to red, the changing moment is moment e, which can be set according to actual needs. The embodiments of the present application will not make specific restrictions.

For example, when acquiring the light color change information of the target traffic light latest recorded, it can be described in combination with the following two scenarios:

in one scenario, the vehicle passes a current intersection for a first time. In the process of driving forward the intersection, the vehicle will detect the light color change situation of the target traffic light in real time, every time detecting that the light color of the target traffic light is changed, the vehicle will record and store the change information of the target traffic light. Assuming that in the process of driving forward the intersection, the vehicle detects that the light color of the target traffic light is changed at a first moment, then records and stores the detected change information of the target traffic light at the first moment; if the vehicle detects again that the light color of the target traffic light is changed at a second moment later, then again records and stores the detected change information of the target traffic light at the second moment; in a condition that from the second moment to current moment when the first light color of the traffic light is detected, the vehicle detects that the light color of the target traffic light is not changed at all, then determines, when acquiring the light color change information of the target traffic light latest recorded, the detected change information of the target traffic light at the second moment as the light color change information of the target traffic light latest recorded, so that the light color change information of the target traffic light latest recorded is acquired.

In one scenario, the vehicle passes the current intersection for rather than the first time. During passing the intersection every time in the past, in the process of driving forward the intersection, the vehicle would detect the light color change situation of the target traffic light in real time, every time detecting that the light color of the target traffic light was changed, the vehicle would record and store the change information of the target traffic light; similarly, during passing the intersection this time, in the process of driving forward the intersection, the vehicle will detect the light color change situation of the target traffic light in real time, every time detecting that the light color of the target traffic light is changed, the vehicle will record and store the change information of the target traffic light. In one case, assuming that in the process of driving forward the intersection this time, the vehicle detects that the light color of the target traffic light is not changed at all till the current moment, then searches the change information of the target traffic light latest recorded from the recorded change information during passing the intersection in the past, and determines the change information of the target traffic light latest recorded as the light color change information of the target traffic light latest recorded, so that the light color change information of the target traffic light latest recorded is acquired. In another case, assuming that in the process of driving forward the intersection this time, the vehicle detects that the light color of the target traffic light is changed at a third moment, then records and stores the detected change information of the target traffic light at the third moment; and from the third moment to the current moment when the first light color of the traffic light is detected, the vehicle detects that the light color of the target traffic light is not changed at all, then determines still, when acquiring the light color change information of the target traffic light latest recorded, the detected change information of the target traffic light at the third moment in the process of driving forward the intersection this time as the light color change information of the target traffic light latest recorded, even if the change information of the target traffic light has been recorded during passing the intersection every time in the past, so that the light color change information of the target traffic light latest recorded is acquired. The advantage of this lies in that: it can avoid the accumulation of errors in the light color change due to the change of the light color change rule of the target traffic light and/or the preset duration corresponding to the respective light color, thereby improving accuracy of the acquired light color change information of the target traffic light.

It should be noted that in the embodiments of the present application, in the process of driving forward the intersection, in addition to detecting the light color change situation of the target traffic light corresponding to the lane on which the vehicle is located in real time, recording and storing the light color change information of the target traffic light, the vehicle will also detect light color change situation of a traffic light corresponding to another lane, and every time detecting that the light color of the traffic light corresponding to the another lane is changed, the vehicle will also record and store the light color change information of the traffic light corresponding to the another lane, thereby the vehicle can be provided basis when the vehicle is going to pass the another lane at any moment in the future.

It can be understood, in the embodiments of the present application, there is no order between the above S201-S202 and S203. S201-S202 may be executed first, then S203 is executed; S203 may be executed first, then S201-S202 may be executed; or S201-S202 and S203 may be executed at the same time, which can be set specifically according to actual needs. Here, the embodiments of the present application only takes the execution of S201-S202 and then the execution of S203 as an example for description, which does not mean that the embodiments of the present application are limited to this.

S204: determining, according to the light color change information, remained duration of the first light color.

After determining the first light color of the target traffic light corresponding to the lane on which the vehicle is located and the remained durations of the light colors respectively, the vehicle can determine a driving strategy at the intersection of the vehicle based on the first light color of the target traffic light corresponding to the lane on which the vehicle is located together with the remained duration of the first light color, that is the following S205 is executed, so as to safely pass the traffic light intersection based on this driving strategy, thereby improving the safety of vehicle driving.

S205: determining, according to the first light color and the remained duration of the first light color, a driving strategy at the intersection of the vehicle.

For example, if the first light color is green and the remained duration of the green is 2 S, then the corresponding driving strategy may be that controlling the vehicle to slow down and brake smoothly, and controlling, when the light color changes to green again, the vehicle again to slowly and safely pass the traffic light intersection. If the first light color is red and a remained duration of the green is 8 S, then the corresponding driving strategy may be that controlling the vehicle to stop slowly and at a constant speed, and slowly and safely pass the intersection when changing to be green light; if the first light color is red and a remained duration of the green is 1 S, then the corresponding driving strategy may be that controlling the vehicle to slow down slowly instead of braking, and slowly and safely pass the intersection when changing to be green light.

It can be seen, in the embodiments of the present application, when passing a traffic light intersection, the vehicle can acquire the traffic light image of the intersection at the driving direction of the vehicle, identify the traffic light image, determine the first light color of the target traffic light corresponding to the lane on which the vehicle is located; and acquire the light color change information of the target traffic light latest recorded; determine the remained duration of the first light color according to the light color change information, then determine the driving strategy at the intersection of the vehicle according to the first light color and the remained duration of the first light color. In this way, the vehicle can determine the driving strategy at the intersection of the vehicle based on the first light color of the target traffic light corresponding to the lane on which the vehicle is located together with the remained duration of the first light color, so as to safely pass the traffic light intersection based on this driving strategy, thereby improving safety of vehicle driving.

Second Embodiment

Based on the embodiment of the above FIG. 2, for example, the light color change information can include the light color before changing, the light color after changing and the changing moment. When acquiring the light color change information of the target traffic light latest recorded and determining the remained duration of the first light color based on the light color change information of the target traffic light latest recorded, in order to ensure the safety of vehicle control, it is necessary to judge the reasonableness of the light color change information of the target traffic light latest recorded to make sure that the light color change information of the target traffic light latest recorded is reasonable. Thus, when detecting the light color of the target traffic light is changed latest, the vehicle will determine whether the light color change information of the target traffic light latest complies with the traffic light period change rule according to the light color before changing, the light color after changing and the changing moment, instead of storing directly the light color change information of the target traffic light; in a condition that the light color change information of the target traffic light latest complies with the traffic light period change rule, then the vehicle stores the light color change information of the target traffic light latest recorded. On the contrary, in a condition that failing to comply with the traffic light period change rule, then the vehicle removes the light color change information of the target traffic light latest recorded. In this way, by determining the remained duration of the first light color by the light color change information of the target traffic light latest recorded, since the light color change information of the target traffic light latest recorded is reasonable, that determining the remained duration of the first light color based on the reasonable light color change information can improve the accuracy of the acquired remained duration of the first light color, thereby improving the safety of vehicle control.

For example, the traffic light period change rule may be: the green light changes to the yellow light, the yellow light changes to the red light and the red light changes to the green light; in which, the preset duration corresponding to the green light may be 20 S, the preset duration corresponding to the yellow light may be 3 S, the preset duration corresponding to the red light may be 20 S; the traffic light period change rule may be: the green light changes to the red light and the red light changes to the green light; in which, the preset duration corresponding to the green light may be 40 S, the preset duration corresponding to the red light may be 20 S; which can be set specifically according to actual needs. The embodiments of the present application will not make specific limits here.

Taking that the traffic light period change rule may be: the green light changes to the yellow light, the preset duration corresponding to the green light is 20 S, the preset duration corresponding to the yellow light is 3 S, the yellow light changes to the red light, the preset duration corresponding to the red light is 20 S, the red light changes to the green light as an example. Assuming when detecting that the light color of the target traffic light is changed, the vehicle records three light color change information, a first light color change information includes a light color before changing is green, a light color after changing is yellow, the changing moment is 12:00:00; a second light color change information includes a light color before changing is yellow, a light color after changing is green, the changing moment is 12:00:03; obviously, in the second light color change information, the light color changing from yellow to green does not comply with the traffic light period change rule, thus, the second light color change information is an invalid light color change information, the second light color change information can be removed; the third light color change information includes a light color before changing is green, a light color after changing is yellow, the changing moment is 12:00:13, although the light color change situation of the third light color change information is that green changes to yellow which complies with the traffic light period change rule, however the duration time of the green light is merely 10 S which does not comply with the preset duration of the green light, thus, the third light color change information is an invalid light color change information, the third light color change information can be removed, only the above first light color change information is retained. In this way, when detecting subsequently, if there is no new light color change information till the current moment, the remained duration of the detected first light color at current moment can be determined on the basis of the first light color change information. In this way, by removing the unreasonable light color change information, it is avoided that the remained duration of the first light color is determined by the invalid light color change information, thus, accuracy of the acquired remained duration of the first light color can be improved to a certain extent, thereby improving the safety of vehicle control.

Based on any one of the above embodiments, for example, in the above S204, when determining the remained duration of the first light color according to the light color change information, the remained duration of the first light color can be determined according to the light color change rule of the target traffic light, the preset duration of the respective light color together with the second light color after changing and the changing moment included in the light color change information. In the following, how to determine the remained duration of the first light color according to the light color change rule of the target traffic light, the preset duration of the respective light colors together with the second light color after changing and the changing moment included in the light color change information will be described in detail in the embodiments of the present application through a third embodiment shown in the FIG. 3 below.

Third Embodiment

Figure 3:
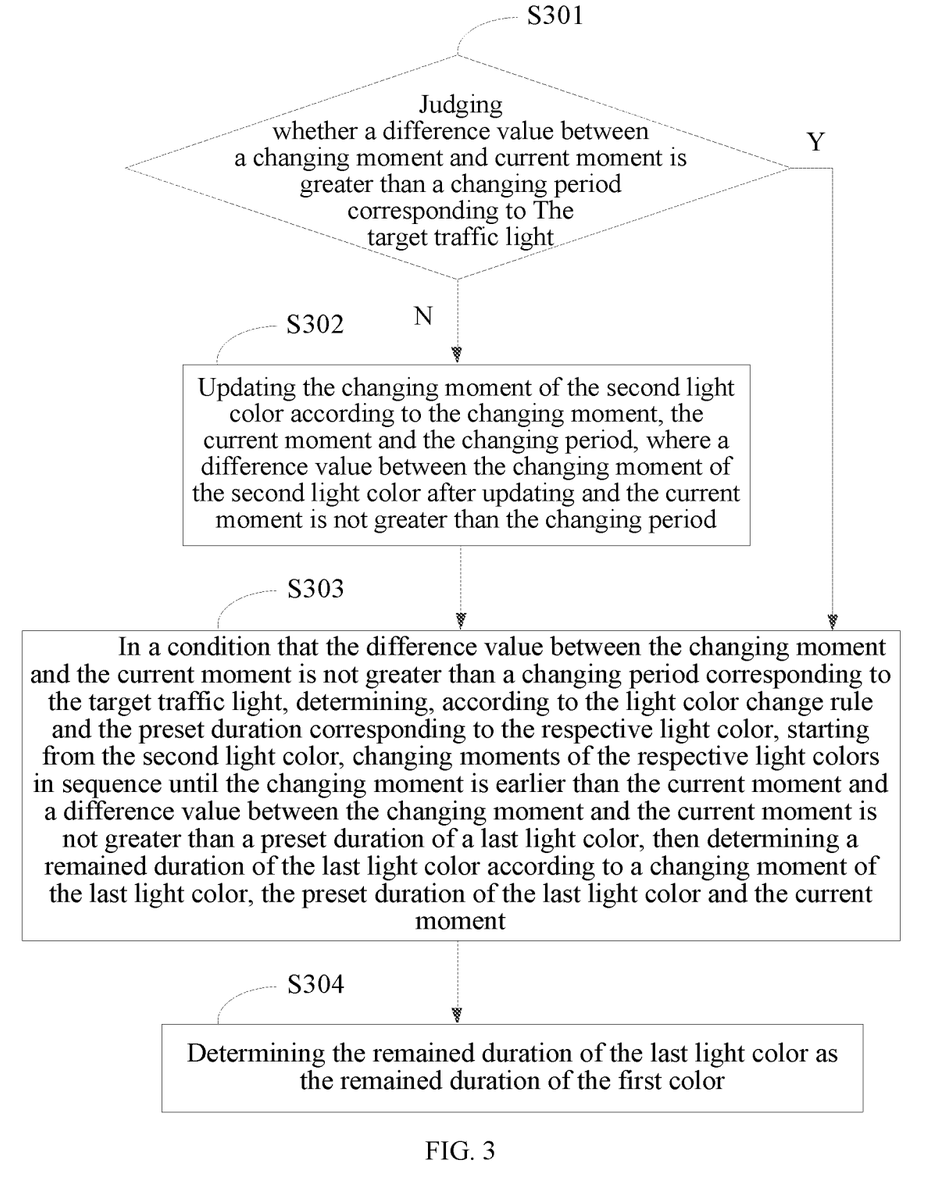
FIG. 3 is a schematic flowchart diagram of a method for determining the remained duration of the first light color provided by a third embodiment of the present application.

FIG. 3 is a schematic flowchart diagram of a method for determining the remained duration of the first light color provided by the third embodiment of the present application; the method for determining the remained duration of the first light color can also be executed by a software and/or a hardware apparatus, for example, the hardware apparatus may be a terminal or a server. For example, please refer to FIG. 3, the determining the remained duration of the first light color may include:

S301: judging whether a difference value between the changing moment and current moment is greater than a changing period corresponding to the target traffic light;

in which, the changing moment is the changing moment when changing to the second light color in the light color change information. The changing period corresponding to the target traffic light is determined according to the traffic light period change rule and the preset duration of the respective light color therein. For example, in a condition that the light color change rule is the green light changes to the yellow light, the yellow light changes to the red light and the red light changes to the green light; in which, the preset duration corresponding to the green light may be 20 S, the preset duration corresponding to the yellow light may be 3 S, the yellow changes to the red, the preset duration corresponding to the red light may be 20 S; then the changing period corresponding to the traffic light is 43 S; in a condition that the light color change rule is the green light changes to the red light and the red light changes to the green light; in which, the preset duration corresponding to the green light may be 40 S, the preset duration corresponding to the red light may be 20 S; then the changing period corresponding to the traffic light is 60 S; which can be set specifically according to actual needs. The embodiments of the present application will not make specific restrictions here.

In a condition that the difference value between the changing moment and the current moment is greater than the changing period corresponding to the target traffic light, it means that the difference value between the moment of the second moment and the current moment is relatively large, which may include multiple changing periods. In order to facilitate the calculation, the changing moment of the second light color can be updated first according to the changing moment and the changing period, so that a difference value between the changing moment of the second light color after updating and the current moment is not greater than the changing period, that is the process of calculation will be constrained in one changing period, that is the following S302-S304 are executed; in a condition that the difference value between the changing moment and the current moment is not greater than the changing period corresponding to the target traffic light, it means that the difference value between the moment of the second moment and the current moment is relatively short, the change of the second light color is in the same changing period as the light color of the current moment, the remained duration of the first light color can be determined directly in the changing period, that is the following S303-S304 are executed.

S302: updating the changing moment of the second light color according to the changing moment, the current moment and the changing period, where a difference value between the changing moment of the second light color after updating and the current moment is not greater than the changing period.

For example, during the period of determining the changing moment to the current moment according to the changing moment, the current moment and the changing period, rolling and polling for at least one complete changing period, and a light color at a starting moment of a remained duration which is less than one changing period is still the second light color, the starting moment is the changing moment of the second light color after updating. In this way, the difference value between the changing moment of the second light color after updating and the current moment is not greater than the changing period, that is the process of calculation will be constrained in one changing period, so as to determine the remained duration of the first light color in the changing period.

Taking that the traffic light period change rule is: the green light changes to the yellow light, the yellow light changes to the red light, the red light changes to the green light; in which, the preset duration corresponding to the green light is 20 S, the preset duration corresponding to the yellow light is 3 S, the yellow light changes to the red light, the preset duration corresponding to the red light is 20 S, the changing period corresponding to corresponding traffic light is 43 S as an example. Assuming the second light color after changing included in the acquired change information is green, the changing moment is 12:00:20; the current moment is 12:07:35, the changing period is 43 S, it can be seen that, from the changing moment 12:00:20 to the current moment 12:07:35, 10 complete changing periods can be rolled and polled, the remained 25 S is less than one complete changing period, the starting moment of the incomplete changing period is 12:07:10, the light color at the starting moment 12:07:10 is still the second light color, the starting moment 12:07:10 is the changing moment of the second light color after updating. In this way, the difference value between the changing moment 12:07:10 of the second light color after updating and the current moment 12:07:35 is not greater than the changing period 43 S, that is the process of calculation will be constrained in one changing period, so as to determine the remained duration of the first light color in the changing period. For details, refer to the following S303:

S303: in a condition that the difference value between the changing moment and the current moment is not greater than a changing period corresponding to the target traffic light, determining, according to the light color change rule and the preset duration corresponding to the respective light color, starting from the second light color, a changing moment of the respective light color in sequence until the changing moment is earlier than the current moment and a difference value between the changing moment and the current moment is not greater than preset duration of a last light color, determining remained duration of the last light color according to a changing moment of the last light color, the preset duration of the last light color and the current moment.

For example, when determining remained duration of the last light color according to the changing moment of the last light color, the preset duration of the last light color and the current moment, a first difference value between the current moment and the changing moment of the last light color can be determined first; and a difference value between the remained duration of the last light color and the first difference value is determined as the remained duration of the last light color.

Figure 4:
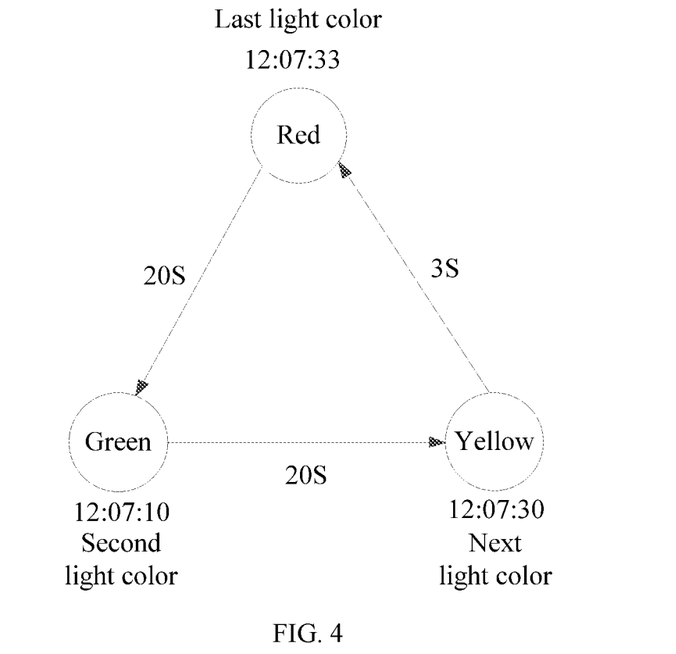
FIG. 4 is a schematic diagram of a light color change provided by an embodiment of the present application.

Assuming that the second light color is green, and the changing moment of the green is 12:07:10, the current moment is 12:07:35, and the difference value between the changing moment of the green 12:07:10 and the current moment 12:07:35 is not greater than the changing period. For example, please refer to FIG. 4, FIG. 4 is a schematic diagram of a light color change provided by an embodiment of the present application; according to the light color change rule and the preset duration corresponding to the respective light color, starting from the green, the changing moment of the respective light color in sequence are determined until the changing moment is earlier than the current moment and the difference value between the changing moment and the current moment is not greater than the preset duration of a last light color specifically is: the changing moment of the green is 12:07:10, and the preset duration of the green is 20 S, the next light color of the green is the yellow, the changing moment of the yellow can be obtained as 12:07:30, although the changing moment 12:07:30 of the yellow is earlier than the current moment 12:07:35, the difference value between the changing moment of the yellow 12:07:30 and the current moment 12:07:35 is greater than the preset duration of the yellow 3 S, thus, continuing to determine the next light color of the yellow is the red, and the changing moment of the red is 12:07:33, the changing moment of the red 12:07:33 is earlier than the current moment 12:07:35, and the difference value between the changing moment of the red 12:07:33 and the current moment 12:07:35 is less than the preset duration of the red 20 S, and calculating the first difference value 2 S between the current moment 12:07:35 and the changing moment 12:07:33 first, then calculating the difference value 18 S between the preset duration corresponding to the red 20 S and the first difference value 2 S, then the 18 S is the remained duration of the last light color red.

S304: determining the remained duration of the last light color as the remained duration of the first color.

It can be understood, the last light color is the first color, thus, the remained duration of the last light color is the remained duration of the first color.

In combination with the example in the above S302, assuming that the second light color is green, and the changing moment is 12:00:20, the current moment is 12:07:35, the changing period is 43 S, then it can be obtained that the current moment is 12:07:35, the light color of the target traffic light is red, and the remained duration is 18 S.

It can be seen that, when determining the remained duration of the first light color, whether a difference value between the changing moment and the current moment is greater than a changing period corresponding to the target traffic light is judged first; in a condition that the difference value between the changing moment and the current moment is not greater than a changing period corresponding to the target traffic light, then, according to the light color change rule and the preset duration corresponding to the respective light color, starting from the second light color, the changing moment of the respective light color in sequence are determined until the changing moment is earlier than the current moment and the difference value between the changing moment and the current moment is not greater than the preset duration of a last light color, then the remained duration of the last light color is determined according to the changing moment of the last light color, the preset duration of the last light color and the current moment; the remained duration of the last light color is determined as the remained duration of the first light color. In this way, after determining the remained duration of the first light color, the driving strategy at the intersection of the vehicle can be determined according to the first light color and the remained duration of the first light color. In this way, the vehicle can determine the driving strategy at the intersection of the vehicle based on the first light color of the target traffic light corresponding to the lane on which the vehicle is located together with the remained duration of the first light color, so as to safely pass the traffic light intersection based on this driving strategy, thereby improving the safety of vehicle driving.

Based on above embodiments, when the vehicle is going to pass the above traffic light intersection another time, in one scenario, in a condition that the vehicle only detects the light color of the target traffic light corresponding to the lane on which the vehicle is located through a sensing module, however, up to the current moment, detects no light color change of the target traffic light, then the remained duration corresponding to the light color of the target traffic light at the current moment can be predicted according to the latest change information of the target traffic light recorded before. The specific method can refer to the relevant description in the embodiment shown in FIG. 3, determining the driving strategy at the intersection of the vehicle based on the light color of the target traffic light together with the remained duration of the light color, and safely passing the traffic light intersection based on this driving strategy, thereby improving the safety of vehicle driving.

When the vehicle is going to pass the above traffic light intersection another time, in another scenario, in a condition that the vehicle not only detects the light color of the target traffic light corresponding to the lane on which the vehicle is located through the sensing module, but also up to the current moment, detects light color change of the target traffic light, even if the change information of the target traffic light has been recorded during passing the intersection in the past, the detected light color change information of the target traffic light in the process of driving this time is determined still as the light color change information of the target traffic light latest recorded, and the light color change information of the target traffic light is determined based on the light color change information of the target traffic light latest recorded, which can avoid the accumulation of errors in the light color change due to the change of the light color change rule of the target traffic light and/or the preset duration corresponding to the respective light color. In this way, determining the driving strategy at the intersection of the vehicle based on the light color of the target traffic light together with the remained duration of the light color, and safely passing the traffic light intersection based on this driving strategy, thereby improving the safety of vehicle driving.

When the vehicle is going to pass the above traffic light intersection another time, in another scenario, if the vehicle is blocked by the vehicle ahead, in a condition that the vehicle neither detects the light color of the target traffic light corresponding to the lane on which the vehicle is located through the sensing module, and up to the current moment, nor detects light color change of the target traffic light, then the remained duration corresponding to the light color of the target traffic light at the current moment can be predicted according to the latest change information of the target traffic light recorded before. The specific method can refer to the relevant description in the embodiment shown in FIG. 3, determining the driving strategy at the intersection of the vehicle based on the light color of the target traffic light together with the remained duration of the light color, and safely passing the traffic light intersection based on this driving strategy, thereby improving safety of vehicle driving.

When the vehicle is going to pass the above traffic light intersection another time, in another scenario, in a condition that a resolution of the traffic light image is smaller than a preset value due to weather and other reasons, and the vehicle detects the light color of the target traffic light corresponding to the lane on which the vehicle is located through the sensing module, however, since that the vehicle may have identification errors, the light color can be determined based on the light color change rule, the preset duration corresponding to the respective light color, and the light color after changing and the changing moment in the light color change information latest recorded. The specific method can refer to the relevant description in the embodiment shown in FIG. 3, in a condition that the light color of the target traffic light obtained by the vehicle identifying the traffic light image is different from the determined light color of the target traffic light, it means that the vehicle has identified incorrectly. In order to prevent a display screen in the vehicle from outputting a wrong light color, the wrong light color can be corrected, and the determined light color of the target traffic light is output through the display screen. In this way, the safety of vehicle driving can be further improved.

Fourth Embodiment

Figure 5:
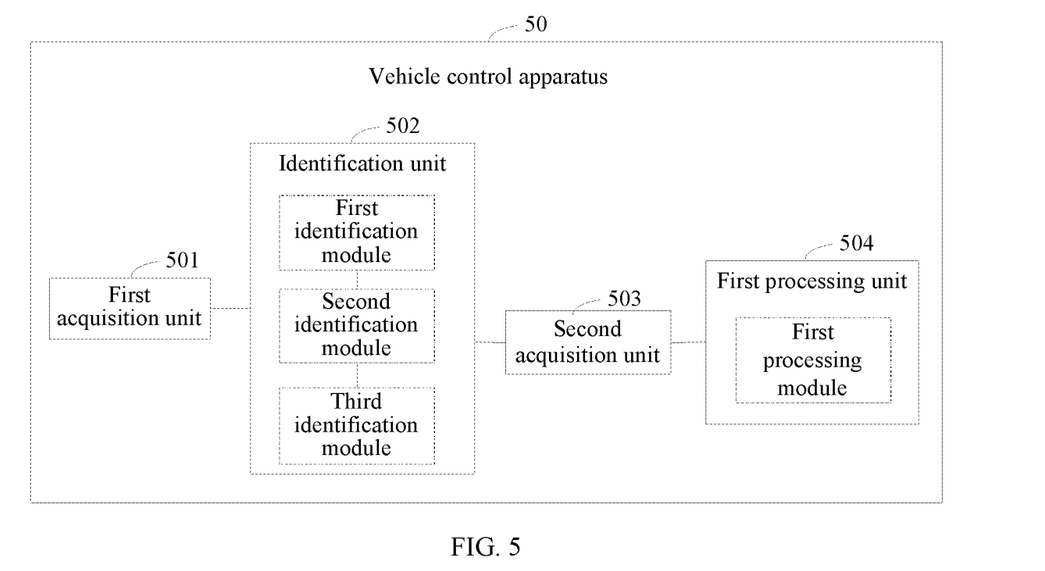
FIG. 5 is a schematic block diagram of a vehicle control apparatus provided by a fourth embodiment of the present application.

FIG. 5 is a schematic block diagram of a vehicle control apparatus 50 provided by a fourth embodiment of the present application. For example, please refer to FIG. 5, the vehicle control apparatus 50 may include:

a first acquisition unit 501, configured to acquire a traffic light image of an intersection at a driving direction of a vehicle.

an identification unit 502, configured to identify the traffic light image and determine a first light color of a target traffic light corresponding to a lane on which the vehicle is located.

a second acquisition unit 503, configured to acquire light color change information of the target traffic light latest recorded.

a first processing unit 504, configured to determine, according to the light color change information, remained duration of the first light color; and determine, according to the first light color and the remained duration of the first light color, a driving strategy at the intersection of the vehicle.

Optionally, the light color change information includes a second light after changing and a changing moment, the first processing unit 504 includes a first processing module.

The first processing module is configured to determine the remained duration of the first light color according to the second light, the changing moment, a light color change rule of the target traffic light and preset duration corresponding to a respective light color.

Optionally, the first processing module includes a first processing sub-module and a second processing sub-module.

The first processing sub-module is configured to: in a condition that a difference value between the changing moment and current moment is not greater than a changing period corresponding to the target traffic light, determine, according to the light color change rule and the preset duration corresponding to the respective light color, starting from the second light color, a changing moment of the respective light color in sequence until the changing moment is earlier than the current moment and a difference value between the changing moment and the current moment is not greater than preset duration of a last light color, determine remained duration of the last light color according to a changing moment of the last light color, the preset duration of the last light color and the current moment.

The second processing sub-module is configured to determine the remained duration of the last light color as the remained duration of the first color.

Optionally, the first processing module includes a third processing sub-module.

The third processing sub-module is configured to: in a condition that the difference value between the changing moment and the current moment is greater than the changing period corresponding to the target traffic light, update a changing moment of the second light color according to the changing moment, the current moment and the changing period, where a difference value between the changing moment of the second light color after updating and the current moment is not greater than the changing period.

Optionally, the second processing sub-module is specifically configured to: determine a first difference value between the current moment and the changing moment of the last light color; and determine a difference value between the remained duration of the last light color and the first difference value as the remained duration of the last light color.

Optionally, the light color change information further includes a light color before changing, the apparatus further includes a second processing unit.

The second processing unit is configured to: determine whether latest light color change information of the target traffic light complies with a traffic light period change rule according to the light color before changing, the second light color after changing and the changing moment; in a condition that the latest light color change information complies with the traffic light period change rule, record the latest light color change information.

Optionally, the vehicle control apparatus 50 further includes a third processing unit.

The third processing unit is configured to: determine a target light color of the target traffic light at the current moment according to the second light color, the changing moment, the light color change rule of the target traffic light and the preset duration corresponding to the respective light color; in a condition that the first light color of the target traffic light obtained by identifying the traffic light image is different from the target light color and a resolution of the traffic light image is smaller than a preset value, determine the target light color as the first light color and outputting the first light color.

Optionally, the identification unit 502 includes a first identification module, a second identification module and a third identification module.

The first identification module is configured to identify the traffic light image and determining a light color of a traffic light corresponding to a respective lane in the traffic light image.

The second identification module is configured to locate the vehicle and determine the lane on which the vehicle is located.

The third identification module is configured to determine, according to the light color of the traffic light corresponding to the respective lane, the first light color of the target traffic light corresponding to the lane on which the vehicle is located.

The vehicle control apparatus 50 provided by the embodiment of the present application can execute the technical solution of the vehicle control method shown in any one of the above embodiments, the implementation principles and beneficial effects are similar to those of the vehicle control method, which can be referred to implementation principles and beneficial effects of the vehicle control method, and will not be repeated here.

According to the embodiments of the present application, the present application further provides a vehicle, which includes the vehicle control apparatus described in above FIG. 5, and correspondingly can execute the technical solution of the vehicle control method shown in any one of the above embodiments, the implementation principles and beneficial effects are similar to those of the vehicle control method, which can be referred to implementation principles and beneficial effects of the vehicle control method, and will not be repeated here.

According to the embodiments of the present application, the present application further provides a computer program product, the computer program product includes a computer program, the computer program stores in a readable storage medium, at least one processor of an electronic device can read the computer program from a readable storage medium, the at least one processor executes the computer program, so as to enable the electronic device to execute the technical solution of the vehicle control method provided by any one of the above embodiments, the implementation principles and beneficial effects are similar to those of the vehicle control method, which can be referred to implementation principles and beneficial effects of the vehicle control method, and will not be repeated here.

According to the embodiments of the present application, the present application further provides an electronic device and a readable storage medium.

Figure 6:
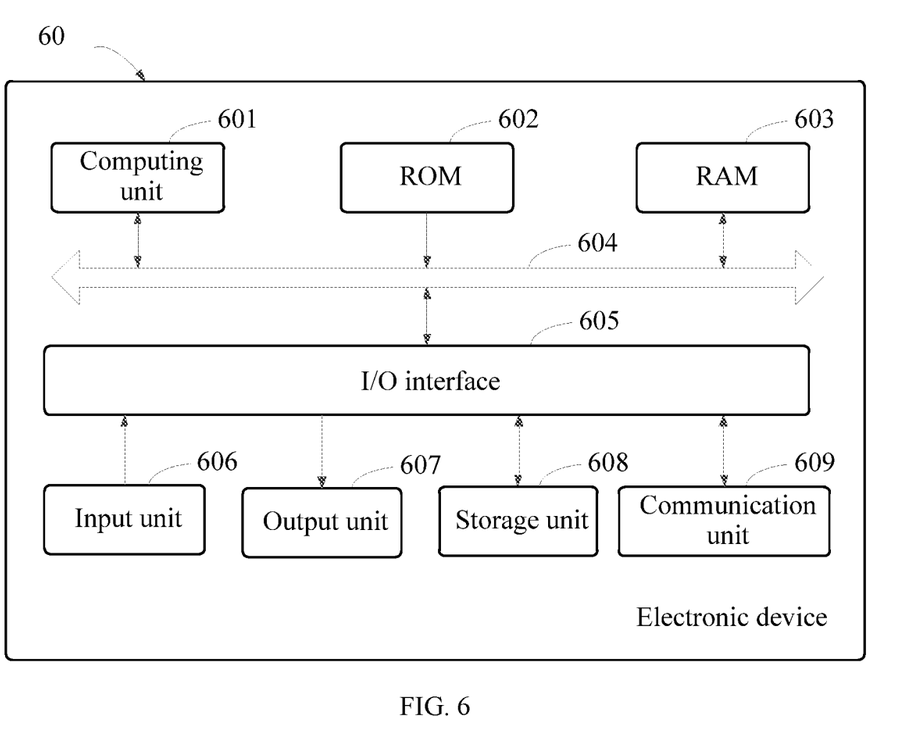
FIG. 6 is a schematic block diagram of an electronic device provided by an embodiment of the present application.

FIG. 6 is a schematic block diagram of an electronic device 60 provided by an embodiment of the present application. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatus, such as a personal digital assistant, a cellular phone, a smart phone, a wearable device and other similar computing apparatus. Components shown herein, their connections and relationships, and their functions are merely as examples and are not intend to limit the implementation of the present disclosure described and/or claimed herein.

As shown in FIG. 6, an electronic device 60 includes a computing unit 601 which can execute various actions and processes according to a computer program stored in a read-only memory (ROM) 602 or a computer program loaded from a storage unit 608 to a random access memory (RAM) 603. In RAM 603, various programs and data required for operations of the device 60 may be stored. The computing unit 601, ROM 602 and RAM 603 are connected to each other through a bus 604. An input/output (I/O) interface 605 is also connected to the bus 604.

Multiple components in the device 60 are connected to the I/O interface 605, including: an input unit 606, for example a keyboard, a mouse etc.; an output unit 607, for example various types of displays, loudspeakers etc.; the storage unit 608, for example a disc, an optical disk etc.; and a communication unit 609, for example a network card, a modulator-demodulator, a radio communication transceiver etc. The communication unit 609 allows the device 60 exchange information/data with other devices through a computer network such as the Internet and/or various telecommunication networks.

The computing unit 601 may be various general and/or dedicated processing components with processing and computing capabilities. Some examples of the computing unit 601 include, but not limit to, a central processing unit (CPU), a graphic processing unit, various dedicated artificial intelligence (AI) computing chips, various computing units running machine learning model algorithms, a digital signal processor, and other suitable processors, controllers, micro-controllers and so on. The computing unit 601 executes various actions and processes described above, for example the vehicle control method. For example, in some embodiments, the vehicle control method can be implemented as a computer software program, which is tangibly contained in a machine readable medium, such as the storage unit 608. In some embodiments, some or all of the computer program can be loaded into and/or installed onto the device 60 via the ROM 602 and/or the communication unit 609. When the computer program is loaded to the RAM 603 and is executed by the computing unit 601, one or more steps of the vehicle control method described above can be executed. Alternatively, in other embodiments, the computing unit 601 can be configured to execute the vehicle control method in any other suitable manner (for example, by means of firmware).

Various implementations of systems and technologies described above herein can be implemented in a digital electronic circuit system, an integrated circuit system, a field programmable gate array (FPGA), an application specific integrated circuit (ASIC), an application-specific standard product (ASSP), a system on chip (SOC), a load programmable logic device (CPLD), a computer hardware, a firmware, a software, and/or a combination of them. These various implementations may include: implementing in one or more computer programs, the one or more computer programs can be executed and/or explained on a programmable system including at least one programmable processor, the programmable processor can be a dedicated or general programmable processor, can receive data and instructions from a storage system, at least one input apparatus and at least one output apparatus, and transmit data and instructions to the storage system, the at least one input apparatus and the at least one output apparatus.

Program codes used to implement the method of the present disclosure can be written in any combination of one or more programming languages. These program codes can be provided to a processor or a controller of a general-purpose computer, a special-purpose computer, or other programmable data processing apparatus, so that when the program codes are executed by the processor or controller, the functions/operations specified in the flowchart and/or block diagram/are implemented. The program codes can be executed entirely on a machine, partly on the machine, partly on the machine and partly on a remote machine or entirely on the remote machine or on a serve as an independent software package.

In the context of the present disclosure, the machine readable medium may be a tangible medium, which can contain or store a program for use by an instruction execution system, apparatus or device, or a program for use in combination with the instruction execution system, apparatus or device. The machine readable medium may be a machine readable signal medium or a machine readable storage medium. The machine readable medium may include, but not limit to, an electronic, magnetic, optical, electromagnetic, infrared or semiconductor system, apparatus or device, or any suitable combination of the foregoing. More specific examples of the machine readable medium will include electrical connections based on one or more wires, a portable computer disk, a hard drive, a random access memory (RAM), a read-only memory (ROM), an erasable programmable read-only memory (EPROM or flash memory), fiber, a portable compact disk read-only memory (CD-ROM), an optical storage device, magnetic storage device, or any suitable combination of the foregoing.

To provide interaction with a user, the systems and techniques described herein can be implemented on a computer, where the computer has: a display device (e.g., a CRT (cathode ray tube) or LCD (liquid crystal display) monitor) used for displaying information to the user; and a keyboard and a pointing apparatus (e.g., a mouse or a trackball), through which the user can provide inputs to the computer. Other kinds of apparatuses can also be used for providing interaction with the user; for example, a feedback provided to the user can be any form of sensory feedback (such as, visual feedback, auditory feedback, or tactile feedback); and can receive inputs from the user in any form (including acoustic input, voice input or tactile input).

The systems and techniques described herein can be implemented in a computing system including background components (e.g., as a data server), or a computing system including middleware components (e.g., an application server), or a computing system including front-end components (e.g., a user computer with a graphical user interface or a web browser through which the user can interact with implementations of the systems and techniques described herein), or a computing system including any combination of such background components, middleware components, or front-end components. Components of the system can be connected with each other through digital data communication in any form or medium (e.g., a communication network). Examples of the communication network include: a local area network (LAN), a block-chain-based service network (BSN), a wide area network (WAN) and the Internet.

A computer system may include a client and a server. The client and the server are generally remote from each other and usually interact through a communication network. A relationship between the client and the server is generated by computer programs running on corresponding computers and having a client-server relationship with each other. The server may be a cloud server, also be called a cloud computer server, is a host product in the cloud computing service system to solve the defects of difficult management and weak business scalability in traditional physical host and VPS service ("Virtual Private Server", or "VPS" for short). The server may also be a server of a distributed system, or a server combined with a block chain.

It should be understood that, steps can be reordered, added or deleted for the various forms of processes shown above. For example, the steps described in the present disclosure can be executed in parallel, or in sequence or in a different order, so long as the desired result of the technical solutions disclosed by the present application can be realized, which is not limited here.

The above specific implementations do not constitute a limitation on the protection scope of the present application. It should be understood by those skilled in the art that, various modifications, combinations, sub-combinations and substitutions can be made according to design requirements and other factors. Any modification, equivalent substitution, improvement and others that are made within the spirit and principle of the present application should be contained in the protection scope of the present application.

What is claimed is:

1. A vehicle control method, comprising:
   acquiring a traffic light image of an intersection at a driving direction of a vehicle;
   identifying the traffic light image and determining a first light color of a target traffic light corresponding to a lane on which the vehicle is located;
   acquiring light color change information of the target traffic light latest recorded, wherein the light color change information comprises a light color before changing, a second light color after changing and a changing moment;
   determining whether latest light color change information of the target traffic light complies with a traffic light period change rule according to the light color before changing, the second light color after changing and the changing moment;
   in a condition that the latest light color change information complies with the traffic light period change rule, recording the latest light color change information; and
   determining, according to the latest light color change information, remained duration of the first light color; and
   determining, according to the first light color and the remained duration of the first light color, a driving strategy of the vehicle at the intersection.

2. The method according to claim 1, wherein the determining, according to the light color change information, the remained duration of the first light color comprises:
   determining the remained duration of the first light color according to the second light color, the changing moment, a light color change rule of the target traffic light and preset duration corresponding to a respective light color.

3. The method according to claim 2, wherein the determining the remained duration of the first light color according to the second light color, the changing moment, the light color change rule of the target traffic light and the preset duration corresponding to the respective light color comprises:
   in a condition that a difference value between the changing moment and a current moment is not greater than a changing period corresponding to the target traffic light, determining, according to the light color change rule and the preset duration corresponding to the respective light color, starting from the second light color, a changing moment of the respective light color in sequence until the changing moment is earlier than the current moment and a difference value between the changing moment and the current moment is not greater than preset duration of a last light color, determining remained duration of the last light color according to a changing moment of the last light color, the preset duration of the last light color and the current moment;

determining the remained duration of the last light color as the remained duration of the first color.

4. The method according to claim 3, further comprising:
in a condition that the difference value between the changing moment and the current moment is greater than the changing period corresponding to the target traffic light, updating a changing moment of the second light color according to the changing moment, the current moment and the changing period, wherein a difference value between the changing moment of the second light color after updating and the current moment is not greater than the changing period.

5. The method according to claim 4, wherein the determining the remained duration of the last light color according to the changing moment of the last light color, the preset duration of the last light color and the current moment comprises:
determining a first difference value between the current moment and the changing moment of the last light color;
determining a difference value between the remained duration of the last light color and the first difference value as the remained duration of the last light color.

6. The method according to claim 3, wherein the determining the remained duration of the last light color according to the changing moment of the last light color, the preset duration of the last light color and the current moment comprises:
determining a first difference value between the current moment and the changing moment of the last light color;
determining a difference value between the remained duration of the last light color and the first difference value as the remained duration of the last light color.

7. The method according to claim 2, wherein the method further comprises:
determining a target light color of the target traffic light at the current moment according to the second light color, the changing moment, the light color change rule of the target traffic light and the preset duration corresponding to the respective light color;
in a condition that the first light color of the target traffic light obtained by identifying the traffic light image is different from the target light color and a resolution of the traffic light image is smaller than a preset value, determining the target light color as the first light color, and outputting the first light color.

8. The method according to claim 1, wherein the identifying the traffic light image and determining the first light color of the target traffic light corresponding to the lane on which the vehicle is located comprises:
identifying the traffic light image and determining a light color of a traffic light corresponding to a respective lane in the traffic light image;
locating the vehicle and determining the lane on which the vehicle is located;
determining, according to the light color of the traffic light corresponding to the respective lane, the first light color of the target traffic light corresponding to the lane on which the vehicle is located.

9. A vehicle control apparatus, comprising:
at least one processor; and a memory communicatively connected with the at least one processor; wherein,
the memory stores instructions capable of being executed by the at least one processor, the instructions are executed by the at least one processor to enable the at least one processor to:
acquire a traffic light image of an intersection at a driving direction of a vehicle;
identify the traffic light image and determine a first light color of a target traffic light corresponding to a lane on which the vehicle is located;
acquire light color change information of the target traffic light latest recorded, wherein the light color change information comprises a light color before changing, a second light after changing and a changing moment;
determine whether latest light color change information of the target traffic light complies with a traffic light period change rule according to the light color before changing, the second light color after changing and the changing moment;
in a condition that the latest light color change information complies with the traffic light period change rule, record the latest light color change information;
determine, according to the latest light color change information, remained duration of the first light color; and
determine, according to the first light color and the remained duration of the first light color, a driving strategy of the vehicle at the intersection.

10. The apparatus according to claim 9, wherein the at least one processor is further configured to:
determine the remained duration of the first light color according to the second light color, the changing moment, a light color change rule of the target traffic light and preset duration corresponding to a respective light color.

11. The apparatus according to claim 10, wherein the at least one processor is further configured to:
in a condition that a difference value between the changing moment and a current moment is not greater than a changing period corresponding to the target traffic light, determine, according to the light color change rule and the preset duration corresponding to the respective light color, starting from the second light color, a changing moment of the respective light color in sequence until the changing moment is earlier than the current moment and a difference value between the changing moment and the current moment is not greater than preset duration of a last light color, determine remained duration of the last light color according to a changing moment of the last light color, the preset duration of the last light color and the current moment;
the at least one processor is further configured to: determine the remained duration of the last light color as the remained duration of the first color.

12. The apparatus according to claim 11, wherein the at least one processor is further configured to:
in a condition that the difference value between the changing moment and the current moment is greater than the changing period corresponding to the target traffic light, update a changing moment of the second light color according to the changing moment, the current moment and the changing period, wherein a difference value between the changing moment of the second light color after updating and the current moment is not greater than the changing period.

13. The apparatus according to claim 12, wherein the at least one processor is further configured to:

determine a first difference value between the current moment and the changing moment of the last light color; and determine a difference value between the remained duration of the last light color and the first difference value as the remained duration of the last light color.

14. The apparatus according to claim 11, wherein the at least one processor is further configured to:
determine a first difference value between the current moment and the changing moment of the last light color; and determine a difference value between the remained duration of the last light color and the first difference value as the remained duration of the last light color.

15. The apparatus according to claim 10, wherein the at least one processor is further configured to:
determine a target light color of the target traffic light at the current moment according to the second light color, the changing moment, the light color change rule of the target traffic light and the preset duration corresponding to the respective light color; in a condition that the first light color of the target traffic light obtained by identifying the traffic light image is different from the target light color and a resolution of the traffic light image is smaller than a preset value, determine the target light color as the first light color and output the first light color.

16. The apparatus according to claim 9, wherein the at least one processor is further configured to:
identify the traffic light image and determine a light color of a traffic light corresponding to a respective lane in the traffic light image;
locate the vehicle and determine the lane on which the vehicle is located;
determine, according to the light color of the traffic light corresponding to the respective lane, the first light color of the target traffic light corresponding to the lane on which the vehicle is located.

17. A vehicle, comprising a vehicle control apparatus, wherein the vehicle control apparatus comprises:
at least one processor; and
a memory communicatively connected with the at least one processor; wherein the memory stores instructions capable of being executed by the at least one processor, the instructions are executed by the at least one processor to enable the at least one processor to:
acquire a traffic light image of an intersection at a driving direction of a vehicle;
identify the traffic light image and determine a first light color of a target traffic light corresponding to a lane on which the vehicle is located;
acquire light color change information of the target traffic light latest recorded, wherein the light color change information comprises a light color before changing, a second light after changing and a changing moment;
determine whether latest light color change information of the target traffic light complies with a traffic light period change rule according to the light color before changing, the second light color after changing and the changing moment;
in a condition that the latest light color change information complies with the traffic light period change rule, record the latest light color change information;
determine, according to the latest light color change information, remained duration of the first light color; and
determine, according to the first light color and the remained duration of the first light color, a driving strategy of the vehicle at the intersection.

18. A non-transitory computer readable storage medium storing computer instructions, wherein the computer instructions are used to enable a computer to execute the vehicle control method according to claim 1.

* * * * *